United States Patent [19]
Fallows, Jr.

[11] 3,805,670
[45] Apr. 23, 1974

[54] BOOSTER VALVE CONTROL MECHANISM
[75] Inventor: Walter Joseph Fallows, Jr., Kalamazoo, Mich.
[73] Assignee: Pneumo Dynamics Corporation, Boston, Mass.
[22] Filed: Sept. 5, 1972
[21] Appl. No.: 286,241

[52] U.S. Cl. ............ 91/378, 91/391 R, 91/417 R, 91/411 A, 91/461
[51] Int. Cl. .......................... F15b 13/10, F15b 9/10
[58] Field of Search ...... 91/391 R, 391 A, 378, 417, 91/461

[56] References Cited
UNITED STATES PATENTS
| | | | |
|---|---|---|---|
| 3,093,119 | 6/1963 | Stelzer | 91/391 R |
| 3,099,940 | 8/1963 | Leduc | 91/378 |
| 3,122,972 | 3/1964 | Rasmussen | 91/391 R |
| 3,143,930 | 8/1964 | Ayers, Jr. | 91/391 A |

*Primary Examiner*—Paul E. Maslousky
*Attorney, Agent, or Firm*—Donnelly, Maky, Renner & Otto

[57] ABSTRACT

Booster valve control mechanism comprises a booster valve freely movable within a booster piston connected to a servo valve during normal operation with hydraulic pressure available for hydraulically actuating the booster piston and servo valve. Upon loss of such hydraulic pressure, a spring will immediately cause the booster valve to bottom against a shoulder in the booster piston permitting direct application of control inputs from the booster valve to the booster piston for controlling the movements of the servo-valve without oscillation or degrading positional accuracy.

11 Claims, 3 Drawing Figures

BOOSTER VALVE CONTROL MECHANISM

BACKGROUND OF THE INVENTION

This invention relates generally as indicated to a booster valve control mechanism especially for use in controlling the movements of servo-valves for operating aerodynamic control surfaces of aircraft and the like.

The flow forces which are encountered by such servo-valves are sometimes high enough to be objectionable, particularly when used to control fluid flow from two hydraulic pressure supply systems to provide for operation of the control surfaces by at least one of such hydraulic pressure supply systems in the event that the other fails.

To overcome such high flow forces, it is common practice to use a booster valve to hydraulically actuate the servo-valve. However, previously if the hydraulic power supply to the booster valve failed, the booster valve had to be driven through its stroke before control inputs could be applied to the servo-valve by the booster valve, resulting in undesirable oscillation and degrading positional accuracy of the servo-valve.

SUMMARY OF THE INVENTION

With the foregoing in mind, it is a principal object of this invention to provide a booster valve control mechanism which provides for hydraulic actuation of the servo-valve so long as hydraulic pressure is available for that purpose and automatically provides for direct manual control of the servo-valve in the event of loss of such hydraulic pressure without oscillation and degrading positional accuracy of the servo-valve.

Another object is to provide such a booster valve control mechanism in which the booster valve is freely movable relative to the servo-valve when fluid pressure is available for actuating the servo-valve and is restrained against movement relative to the servo-valve upon loss of such hydraulic pressure to permit direct application of control inputs from the booster valve to the servo-valve without any backlash of the booster valve.

These and other objects of the present invention may be achieved by providing a booster valve control mechanism in which the booster valve is freely movable within a booster piston connected to the servo-valve during normal operation with the hydraulic power supply for actuating the booster piston intact to provide normal low force level hydraulic inputs to the booster piston sufficient to overcome the flow forces acting on the servo-valve as required. However, should the hydraulic power supply to the booster valve control mechanism fail, a spring immediately causes the booster valve to bottom against a shoulder in the booster piston permitting direct application of control inputs from the booster valve to the servo-valve without undesirable oscillation or degrading positional accuracy.

DESCRIPTION OF THE PREFERRED EMBODIMENT

Figure 1:
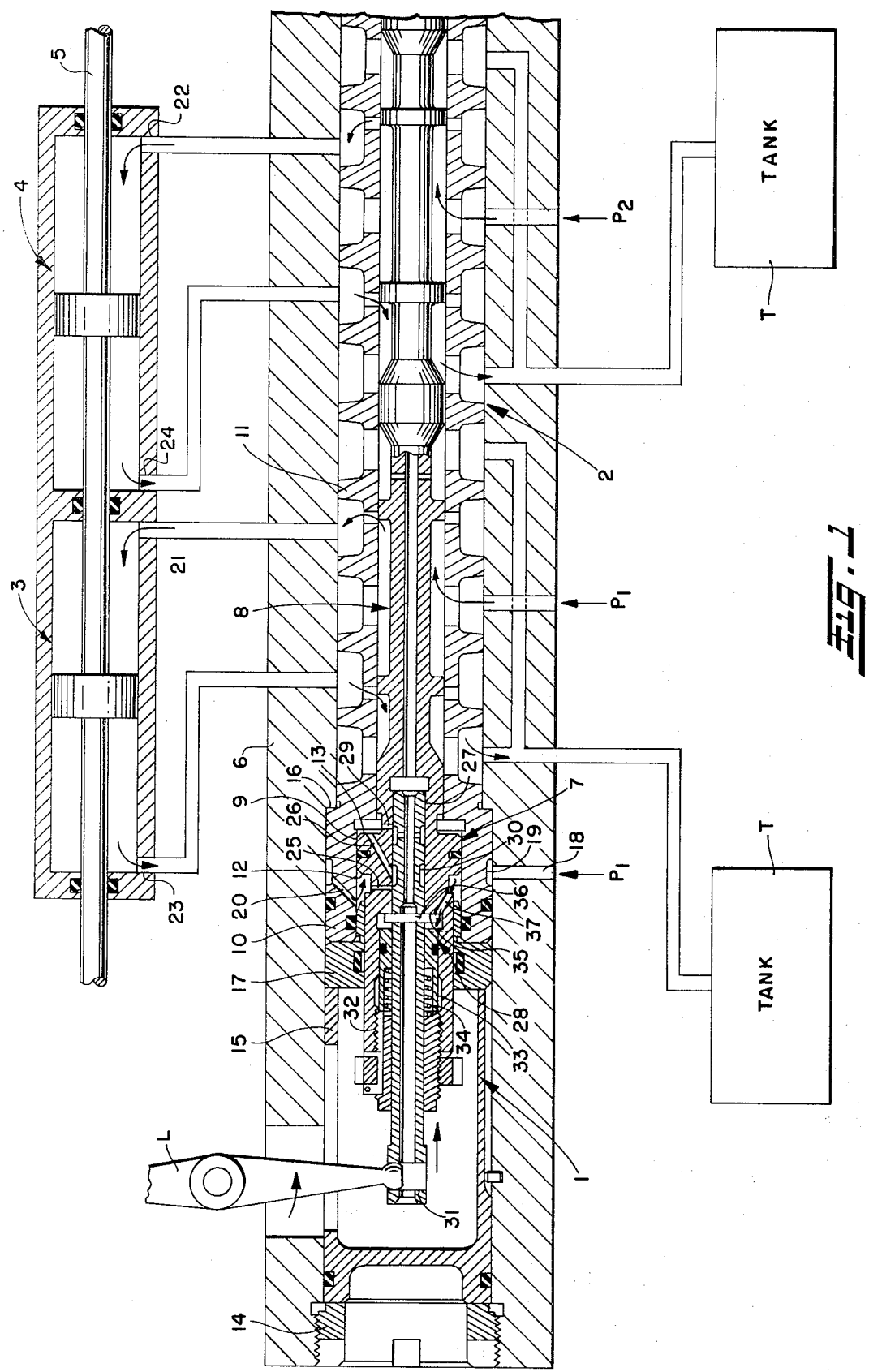
FIG. 1 is a fragmentary longitudinal section through a preferred form of booster valve control mechanism constructed in accordance with this invention shown connected to a dual tandem servo-valve, the booster valve being positioned for hydraulically urging the servo-valve toward the right as seen in FIG. 1.

Referring now in detail to the drawing, and initially to FIG. 1 thereof, there is shown a preferred form of booster valve control mechanism 1 in accordance with this invention connected to a servo valve 2 for controlling the movements thereof in a manner to be fully described hereafter. The servo-valve 2 may be of any conventional type but desirably includes suitable porting for conducting fluid from two different pressure sources $P_1$ and $P_2$ to and from the ends of a pair of dual tandem cylinders 3 and 4 having a common rod 5 extending from the respective pistons for the cylinders 3 and 4 for connection to the device to be actuated thereby such as the control surface of an aircraft. Duplication of the cylinders 3 and 4 and porting for the servo-valve 2 permits operation of the control surface by at least one of two hydraulic pressure supply systems in the event of failure of the other.

Oftentimes the flow forces acting on such a servo-valve 2 are high enough to be objectionable, thus providing the need for the booster valve control mechanism 1 of the present invention to overcome such flow forces. The booster valve control mechanism 1 and servo-valve 2 may be contained within a common housing 6 as shown with the booster piston head 7 of the booster control mechanism integral with the servo-valve spool 8 and axially movable in a counterbore 9 in an enlarged end 10 of the porting sleeve 11 for the servo valve. The booster piston 7 is also desirably stepped to provide unequal surface areas on opposite sides 12 and 13 thereof whereby application of fluid pressure to one or both sides will cause movement of the booster piston in opposite directions as described hereafter.

The porting sleeve 11 may be retained in place within the housing 6 by a nut 14 having threaded engagement in one end of the housing. When tightened, the nut 14 forces a tubular member 15 within the housing against the enlarged end 10 of the porting sleeve pressing such enlarged end against a shoulder 16 in the housing. A bushing 17 may be interposed between the tubular member 15 and porting sleeve 11 to guide the booster piston 7 during axial movements thereof.

Fluid pressure is desirably normally supplied to the booster valve control mechanism 1 through a pressure port 18 in the housing 6 communicating with an annular groove 19 in the enlarged end 10 of the porting sleeve 11 and a radial passage 20 extending from the annular groove 19 to the porting sleeve interior between the bushing 17 and smaller area side 12 of the booster piston. One of the two hydraulic pressure supply systems $P_1$ used to supply hudraulic pressure to the dual tandem cylinders 3 and 4 may also be used to supply fluid pressure to the booster valve control mechanism, or a separate hudraulic pressure supply system may be provided as desired.

With fluid pressure acting only on the smaller area side 12 of the booster piston 7, the booster piston 7 and servo-valve spool 8 connected thereto will be urged to the right as viewed in FIG. 1 to connect the right-most ends 21 and 22 of the fluid cylinders 3 and 4 with the pressure supplies $P_1$ and $P_2$ and the other ends 23 and 24 to tank T thus to cause movement of the actuating rod 5 to the left. Movement of the valve spool 8 in the opposite direction will occur upon application of fluid pressure to both sides 12 and 13 of the booster piston, the pressure acting on the larger area side 13 causing the booster piston 7 and servo-valve 8 to move to the left against the pressure acting on the smaller area side 12 for flow of fluid in the reverse direction to and from the fluid cylinders 3 and 4 as shown in FIG. 2.

Selective pressurizing of the larger area side 13 of the booster piston 7 may be achieved via a pair of spaced apart radial passages 25 and 26 in the booster piston providing communication between a central bore 27 in the booster piston and the exterior thereof on opposite sides of the booster piston head. A booster valve 28 is axially movable in the central bore 27 for selectively blocking and establishing communication between such radial passages 25 and 26. When the booster valve 28 is moved to the right as shown in FIG. 1, fluid communication between such radial passages 25 and 26 is blocked by the booster valve and any fluid pressure acting on the larger area side 13 of the booster piston is relieved through still another radial passage 29 in the booster piston which may be connected to tank T through aligned radial and axial passages in the booster valve 28 and servo valve spool 8 as shown. Accordingly, the fluid pressure acting on the smaller area side 13 of the booster piston 7 will cause the plunger 7 and servo-valve spool 8 to move toward the right as aforesaid.

Figure 2:
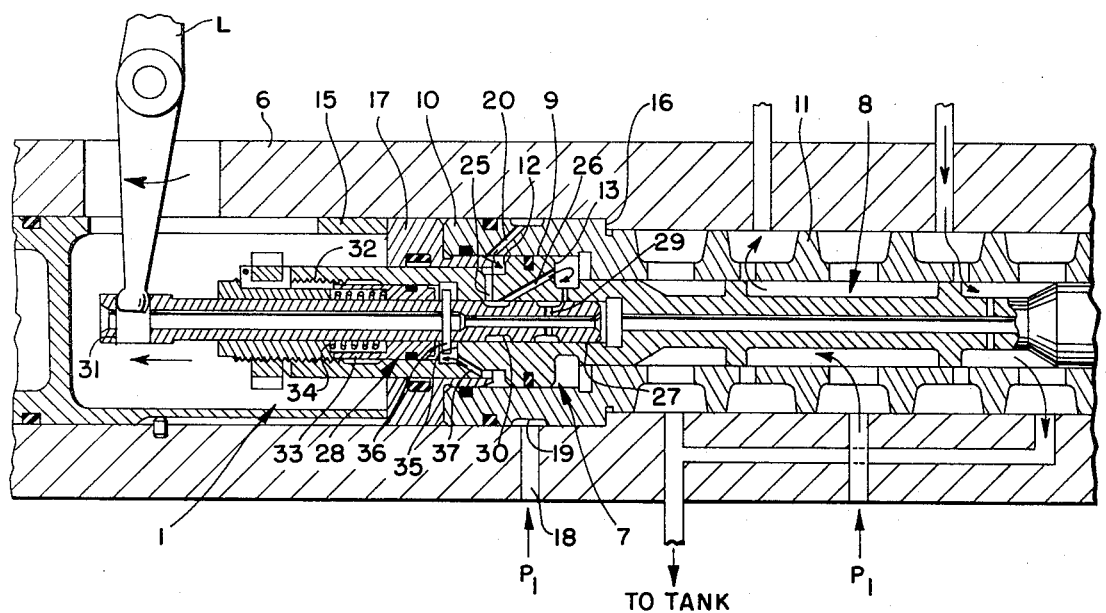
FIG. 2 is a fragmentary longitudinal section similar to FIG. 1 but showing the booster valve positioned for hydraulically urging the servo valve toward the left.
Figure 3:
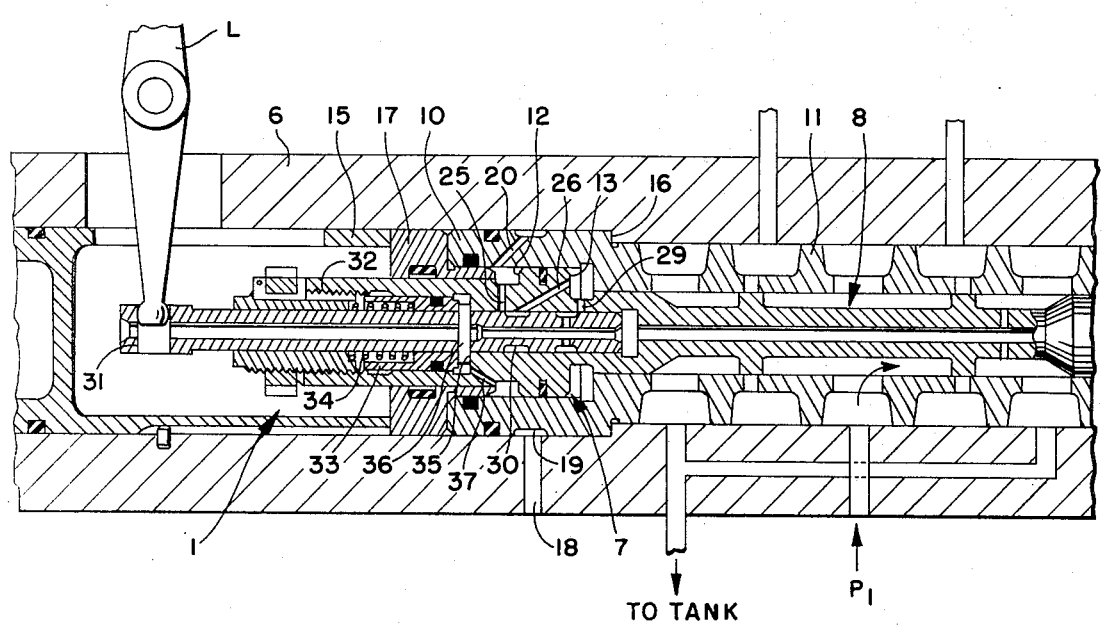
FIG. 3 is a fragmentary longitudinal section also similar to FIG. 1 but showing the booster valve bottomed against a shoulder in the booster piston after loss of hydraulic pressure to the booster valve control mechanism permitting direct application of control inputs from the booster valve to the booster piston.

Movement of the booster valve 28 to the left will block the return flow path from the larger area side 13 of the booster piston 7 to tank and establish communication between the radial passages 25 and 26 via an annular groove 30 in the booster valve for pressurizing the large area side 13 of the booster piston thus to cause movement of the booster piston and servo-valve toward the left as shown in FIG. 2 of the drawing.

Axial movement of the booster valve 28 may be obtained by actuation of a pivotally mounted operating lever L having one end extending through aligned slots in the housing 6 and tubular member 15 for receipt in a transverse opening 31 in the outer end of the booster valve. The other end of the lever L may be connected through a suitable linkage (not shown) to the cockpit of the aircraft for actuation by the pilot.

The central bore 27 in the booster piston 7 which receives the booster valve 28 is desirably counterbored at 32 as shown to provide clearance around the booster valve for a sleeve 33. The sleeve 33 is urged by a spring 34 toward a shoulder 35 in the booster piston, and a transverse pin 36 desirably extends through the booster valve 28 with its ends projecting between the sleeve 33 and shoulder 35. Normally, the spring 33 is compressed by fluid pressure entering the counterbore 32 adjacent the shoulder 35 via a passage 37 in the booster piston communicating with the exterior adjacent the smaller area side, thus allowing the booster valve 28 to move freely within the booster piston for providing normal low force level inputs through movement of the operating lever to hydraulically control the movements of the booster piston and servo-valve spool connected thereto as previously described.

However, should there be a loss of hydraulic pressure $P_1$ to the booster valve control mechanism 1, the spring 34 acting on the sleeve 33 will urge the sleeve 33 against the booster valve pin 36 causing the booster valve 28 to bottom against the shoulder 35 in the booster piston, whereby movements of the booster valve 28 will be transmitted directly to the booster piston 7 for controlling the flow of fluid pressure from the pressure supply system $P_2$ to and from the cylinder 4. Accordingly, the booster valve 28 need not be driven through its stroke before direct application of control inputs can be applied from the booster valve to the booster piston, thereby eliminating any objectionable oscillation and degrading positional accuracy of the servo-valve during manual operation of the booster piston as well as during fluid pressure actuation thereof.

The embodiments of the invention in which an exclusive property or privilege is claimed are defined as follows:

1. A booster valve control mechanism comprising a housing, a piston axially movable within said housing, a valve member axially movable within said piston to cause movement of said piston in opposite directions, and means for restraining said valve member against movement relative to said piston upon loss of such fluid pressure, whereby movements of said valve member will be transmitted directly from said valve member to said piston upon loss of fluid pressure, said means for restraining said valve member against movement relative to said piston comprising spring means for urging said valve member against a shoulder on said piston upon such loss of fluid pressure, said spring means being made ineffective by such fluid pressure.

2. The mechanism of claim 1 wherein said spring means comprises a sleeve surrounding said valve member and a spring urging said sleeve toward a projection on said valve member, such fluid pressure acting on said sleeve being effective to compress said spring and thereby maintain said sleeve away from said projection permitting movement of said valve member relative to said piston as aforesaid.

3. The mechanism of claim 2 wherein said projection on said valve member comprises a transverse pin extending through said valve member, said transverse pin having its ends projecting between said sleeve and said shoulder on said piston.

4. A booster valve control mechanism comprising a housing, a piston axially movable within said housing, a valve member, means mounting said valve member for axial movement in opposite directions relative to said piston, means for directing fluid pressure against said piston to cause movement of said piston in opposite directions in response to such axial movement of said valve member in opposite directions relative to said piston, and means for restraining said valve member against any axial movement in either direction relative to said piston upon loss of such fluid pressure, whereby movements of said valve member will be transmitted directly from said valve member to said piston upon such loss of fluid pressure.

5. The mechanism of claim 4 wherein said means for restraining said valve member against axial movement in either direction relative to said piston upon such loss of fluid pressure comprises means for urging said valve member axially against a portion of said piston in response to such loss of fluid pressure and maintaining said valve member against said piston so that movements of said valve member will be transmitted directly from said valve member to said piston until such fluid pressure is restored.

6. The mechanism of claim 4 wherein said piston has opposite sides of unequal areas, and means are provided for causing such fluid pressure normally to act on the smaller side only, said valve member being selectively movable either to admit fluid pressure to said larger area side or release such fluid pressure from said larger area side through passage means in said mechanism for fluid pressure actuation of said piston in opposite directions.

7. The mechanism of claim 4 further comprising a servo-valve including a valve spool driven by said piston, and a cylinder containing a further piston, said cylinder being connected to said servo-valve for actuation of said further piston through movements of said piston and valve spool.

8. The mechanism of claim 7 wherein said valve spool is integral with said piston.

9. The mechanism of claim 7 wherein said housing is common to said piston and servo-valve, and said servo-valve includes a porting sleeve for said valve spool having a counterbore in one end for receipt of said piston.

10. The mechanism of claim 7 wherein there are two of said cylinders connected in tandem and said servo-valve is a dual tandem servo-valve, and means are provided for conducting fluid from two separate pressure sources to and from the respective ends of said cylinders.

11. The mechanism of claim 10 further comprising means for conducting fluid from one of such pressure sources for actuating said piston, whereby if there is a failure of such one pressure source, fluid pressure from the other source may still be directed to and from one of said cylinders through direct application of control inputs from said valve member to said piston and valve spool without oscillation or degrading positional accuracy of said servo-valve.

* * * * *